J. H. SEAMAN.
GASALIER.
No. 10,071. Reissued Apr. 4, 1882.
Fig. 1.
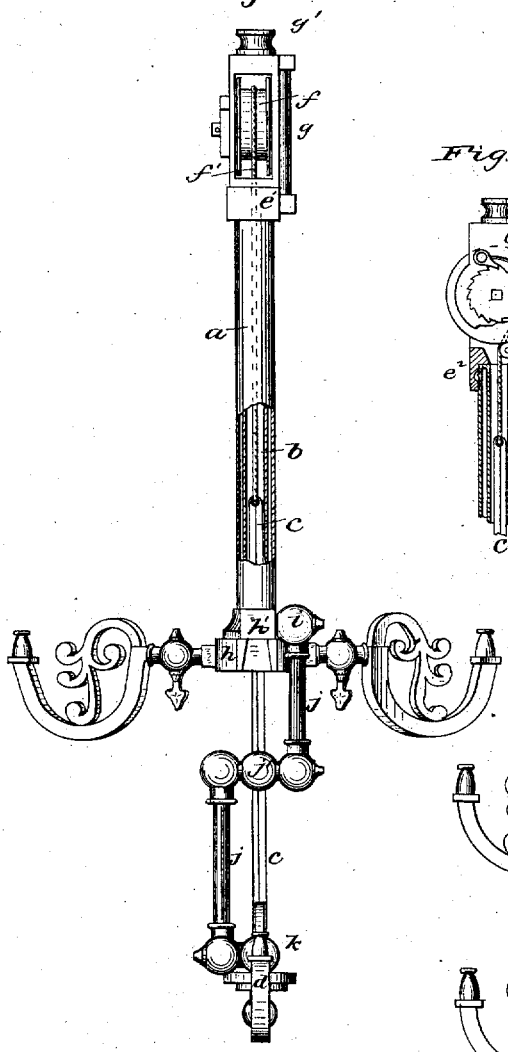
Fig. 3
Fig. 2.
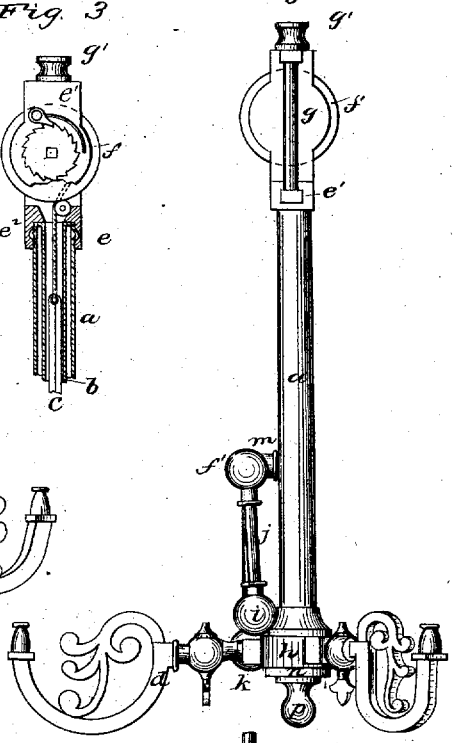
Fig. 4.
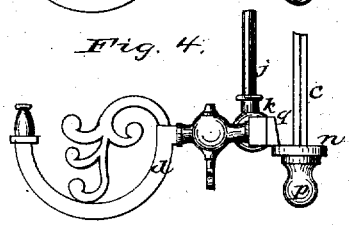
Witnesses:
H. N. Low
J. S. Barker.
Inventor:
John H. Seaman
by Doubleday & Bliss
Attys.
N. PETERS, Photo-Lithographer, Washington, D. C.

UNITED STATES PATENT OFFICE.

JOHN H. SEAMAN, OF BROOKLYN, NEW YORK.

GASALIER.

SPECIFICATION forming part of Reissued Letters Patent No. 10,071, dated April 4, 1882.

Original No. 116,359, dated June 27, 1871. Application for reissue filed February 18, 1882.

*To all whom it may concern:*

Be it known that I, JOHN H. SEAMAN, a citizen of the United States, of Brooklyn, E. D., in the county of Kings and State of New York, have invented certain new and useful Improvements in Gasaliers; and I do hereby declare the following is a full, clear, and exact description of the invention, that will enable others skilled in the art to which it appertains to make and use the same, reference being had to the accompanying drawings, and to letters of reference marked thereon, which form a part of this specification.

My invention relates to gasaliers or chandeliers for burning gas, suspended from the ceiling at a fixed elevation; and it consists in certain new and useful combinations of mechanisms, whereby one of the branches is made movable and may be drawn down from the chandelier to serve as a drop-light, the gasway being preserved by extensible metallic connections.

The first part of my invention consists in combining a movable branch with a sliding rod which passes up into the stem of the chandelier, occupying the axis thereof, but which forms no part of the gasway, and is cut off from the gasway of the stem by an internal pipe fitted to receive the guide loosely, said internal pipe also being placed within the stem and cut off from the gasway of the stem at top and bottom by a suitable plug between it and the stem-pipe at each end, the gasway of the stem being the annulus or space or spaces between the stem-pipe and the inner pipe which receives the slide.

My invention further consists in combining with the stem or gas center and the movable branch a folding gas-pipe, whereby an extensible metallic connection is made with the gasway of the movable branch.

My invention further consists in a novel combination and arrangement of a stationary tube-section, a sliding burner-support, and a spring cord-winding mechanism, the cord passing down through the stationary tube-section, and a guiding-pulley which directs the cord within the tube.

Figure 1 of the drawings represents a front view, partly in section, of a chandelier constructed with my improvements, showing the movable branch drawn down to use as a drop-light. Fig. 2 is a side elevation of the same, showing the movable branch in place as one of the branches of the chandelier. Fig. 3 is a view of the upper part of the stem and spring-barrel, partly in section; Fig. 4, a detached view of the movable branch and sliding rod.

*a* represents the stem of the chandelier, and *b* the internal pipe or guide for the sliding rod *c* of the movable branch *d*. The internal guide, *b*, is preferably made of square pipe, to correspond with the square form of the sliding rod *c*, which is fitted to play up and down loosely within it. The internal guide-pipe, *b*, extends through the stem, being of the same length, and both pipes are attached to each other at each end by an annular plug, or by solder, which fills up the space at the ends between the inner and outer pipes and leaves the inner pipe open at both ends, in manner as shown with respect to the upper end at Fig. 3. The upper end of the stem is screwed into a screw-hole, *e*, in the lower part of the casting or frame *e'*, which contains the spring-barrel *f*, the cord *f'* from which passes down through the screw-hole into the internal guide, *b*, and connects with the sliding rod of the movable branch. The gasway of the stem communicates by side holes in the screw-joint with a recess, $e^2$, in the screw-hole, which connects with the small side pipe, *g*, the latter connecting by a chamber or passage in the upper part of the frame *e'* with the stiff screw-joint *g'*, by which the chandelier is connected to the supply-pipe in the ceiling. The lower part of the stem is connected with the cast center piece, *h*, in a similar manner, it being screwed into the center and having lateral holes communicating with a recess in the center piece surrounding the gas-pipe, which recess communicates with the gasway of the fixed branches, as usual in gas-fixtures. The recess in the center piece, *h h*, also communicates with the gasway of a boss, *h'*, cast or brazed upon the center piece, *h*, and which connects with the turning joint *i* of the folding pipe *j*, the other end of said folding pipe being connected by a turning joint, *k*, with the gasway of the movable branch. The folding pipe *j* has a folding joint, *j'*, nearly at the middle of its length, and should be provided with a stop, *m*, to prevent its joints being brought in line, thereby impeding the movement of the movable branch.

The usual ornamental part, *n*, of the center piece in chandeliers is detached therefrom and made the medium of connecting the movable branch with the sliding rod, the knob *p* serving as a handle to move the branch up and down. A recess, *w*, with inclined sides, is also formed in the center piece to receive the shoulder *q* of the movable branch, so that when in place it appears to be a fixed part of the chandelier.

By an examination of the drawings it will be readily understood the sliding rod *c*, the ornamental part *n*, and shoulder *q* constitute a support for the rising and falling branch pipe *d* and the burner, and that by means of the ratchet-wheel *o* and pawl *u*, the ratchet-wheel being attached to the shaft of the spring-barrel, the tension of the spring may be so regulated as to effect the desired suspension of the burner-support.

It will also be seen that the pulley *a* serves to guide the cord from the spring-barrel to a proper position within the tube-section.

I do not claim as my invention the invention secured in the patent to Charles Deans of July 19, 1870.

I claim as my invention—

1. In a chandelier, the combination of a stationary tube-section, a burner-support adapted to slide relatively thereto and arranged to always overlap the same, a spring-barrel, a cord which passes through the stationary tube-section and connects the spring-barrel with the burner-support, and a guiding-pulley adapted to direct the cord from the spring-barrel to the tube-section, substantially as set forth.

2. In a chandelier, the combination, with the stationary tube-section, the sliding burner-support, the spring-barrel, and cord, of a ratchet and pawl arranged, substantially as set forth, to hold the spring at different tensions and to permit the tension thereof to be adjusted independently of the burner-support.

3. In combination with a pendant or chandelier for burning gas, a movable branch pipe, a sliding guide-rod attached to said movable pipe, and a stationary stem having an internal guideway for said rod cut off from the gasway, substantially as set forth.

4. In combination with the movable branch, sliding rod, and a stem with an internal guide cut off from the gasway, the folding gas-pipe, whereby an extensible metallic gasway is obtained between the gas center and the movable branch, substantially as described.

5. The spring-barrel and cord, arranged substantially as shown, in combination with the stem, the guideway within the stem, and the sliding rod which supports the movable part of the chandelier.

In testimony whereof I affix my signature in presence of two witnesses.

JOHN H. SEAMAN. [L. S.]

Witnesses:

J. VAN SANTVOORD,

E. F. KASTENHUBER.